(12) United States Patent
Bonnell

(10) Patent No.: US 11,942,006 B2
(45) Date of Patent: *Mar. 26, 2024

(54) TRANSPORT EQUIPMENT LABEL BRACKET

(71) Applicant: UNITED STATES POSTAL SERVICE, Washington, DC (US)

(72) Inventor: Clayton C. Bonnell, Fairfax, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,885

(22) Filed: Dec. 7, 2022

(65) Prior Publication Data

US 2023/0097680 A1    Mar. 30, 2023

Related U.S. Application Data

(60) Continuation of application No. 16/886,508, filed on May 28, 2020, now Pat. No. 11,562,667, which is a division of application No. 16/132,073, filed on Sep. 14, 2018, now Pat. No. 10,692,405.

(51) Int. Cl.
*G09F 7/18* (2006.01)
*F16M 13/02* (2006.01)
*G09F 21/00* (2006.01)

(52) U.S. Cl.
CPC ............... *G09F 7/18* (2013.01); *F16M 13/02* (2013.01); *G09F 21/00* (2013.01); *G09F 2007/1847* (2013.01); *G09F 2007/1856* (2013.01)

(58) Field of Classification Search
CPC .... G09F 7/18; G09F 21/00; G09F 2007/1847; G09F 2007/1856
See application file for complete search history.

(56) References Cited

U.S. PATENT DOCUMENTS

| | | | | |
|---|---|---|---|---|
| 5,450,681 A | * | 9/1995 | Stolzman | G09F 7/18 40/607.14 |
| 5,711,430 A | * | 1/1998 | Andersen | A47G 1/21 211/89.01 |
| 5,774,885 A | | 6/1998 | Delfer, III | |

(Continued)

OTHER PUBLICATIONS

Office Action dated Nov. 29, 2019 for parent U.S. Appl. No. 16/132,073, filed Sep. 14, 2018, pp. 1-15.

*Primary Examiner* — Gary C Hoge
(74) *Attorney, Agent, or Firm* — MH2 TECHNOLOGY LAW GROUP, LLP

(57) ABSTRACT

A method is provided for tracking and/or locating a delivery item. A first delivery-item transport equipment label is temporarily attached to a bracket, wherein the bracket includes a main body with a first identifier permanently attached to the bracket and a second identifier comprising a radio-frequency identification (RFID) chip permanently attached to the bracket. The first delivery-item transport equipment label and at least one of the first identifier and the second identifier are scanned to associate the first delivery-item transport equipment label with at least the RFID chip. The RFID chip is scanned during use of a delivery-item transport equipment to which the bracket is attached. A location of the first delivery-item transport equipment label is identified based on the scanning of the RFID chip.

20 Claims, 5 Drawing Sheets

(56) References Cited

U.S. PATENT DOCUMENTS

| | | | | |
|---|---|---|---|---|
| 5,787,623 A * | 8/1998 | Schutz | ............... | G09F 7/18 |
| | | | | 411/40 |
| 6,722,067 B1 * | 4/2004 | Kennedy | ............... | G09F 15/00 |
| | | | | 40/607.05 |
| 9,279,573 B1 * | 3/2016 | Perez-Bravo | ............ | G09F 9/301 |
| 2002/0125397 A1 * | 9/2002 | Wear | ............... | A47G 1/0611 |
| | | | | 248/473 |
| 2005/0288947 A1 | 12/2005 | Mallonee et al. | | |
| 2006/0288620 A1 * | 12/2006 | Weyrauch | ............ | G09F 7/18 |
| | | | | 40/611.01 |
| 2010/0055380 A1 * | 3/2010 | Schutz | ............... | G09F 23/00 |
| | | | | 428/81 |
| 2012/0110883 A1 * | 5/2012 | White | ............... | G09F 15/00 |
| | | | | 40/606.01 |
| 2012/0144708 A1 * | 6/2012 | Schwartz | ............ | G09F 7/12 |
| | | | | 40/606.01 |
| 2020/0090557 A1 | 3/2020 | Bonnell | | |
| 2020/0294427 A1 | 9/2020 | Bonnell | | |

* cited by examiner

TRANSPORT EQUIPMENT LABEL BRACKET

CROSS-REFERENCE TO RELATED APPLICATIONS

This is a continuation of U.S. patent application Ser. No. 16/886,508, filed May 28, 2020, which is a divisional application of, and claims priority to, U.S. patent application Ser. No. 16/132,073, filed Sep. 14, 2018 and issued as U.S. Pat. No. 10,692,405 on Jun. 23, 2020. The disclosures of U.S. patent application Ser. No. 16/886,508 and U.S. Pat. No. 10,692,405 are hereby incorporated herein by reference in their entirety.

TECHNICAL FIELD

The present teachings generally relate to tracking of transportation assets and, more particularly, to identification and tracing of transportation assets through a transportation supply chain.

BACKGROUND

To provide quality transportation and distribution service for items that are delivered to a recipient, such as letters, magazines, packages, mail, goods, freight, and the like, (hereinafter, collectively, delivery items) a delivery or transportation service provider, (such as the U.S. Postal Service, the FedEx Company, the United Parcel Service company, another country's postal service, etc.), must create and maintain an organized integrated network for tracking the assets or equipment that is used to transport the delivery items, such as carts, pallets, vehicles, etc. Effective management of such networks provides lower cost, reduced delivery time, and enhanced customer service. Management of an integrated transportation network may include management of asset tracking infrastructure and logic, management of distribution, and management of information services supporting tracking and tracing of in-transit delivery items. Another important component of an integrated transportation network is proactive management of the transportation supply chain from receipt to delivery.

A service provider may collect real-time data related to in-transit tracking of delivery items by tracking containers, carts, and other assets that contain or move the delivery items. Continuous tracking of these assets may be significantly complicated when destination points and transportation routes do not remain the same, but instead change on a daily basis, even for delivery items inserted into a processing stream at the same origination point. Close real-time monitoring of delivery items in the transportation network allows a service provider to continuously evaluate performance of its transportation carriers, improve management of assets resulting in decreased transportation costs, and provide real-time location information to customers.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, a method for tracking and/or locating a delivery item is provided. A first delivery-item transport equipment label is temporarily attached to a bracket. The bracket includes a main body with a first identifier permanently attached to the bracket and a second identifier including a radio-frequency identification (RFID) chip permanently attached to the bracket. The first delivery-item transport equipment label and at least one of the first identifier and the second identifier are scanned to associate the first delivery-item transport equipment label with at least the RFID chip. The RFID chip is scanned during use of a delivery-item transport equipment to which the bracket is attached. A location of the first delivery-item transport equipment label is identified based on the scanning of the RFID chip.

The temporarily attaching the first delivery-item transport equipment label to the bracket can further include inserting the first delivery-item transport equipment label between a front face of the main body and a display rail of the bracket, and applying tension to the display rail using spring clips. The spring clips include spring clip mounting tabs that extend through slots in the main body. The spring clips physically contact and cooperatively engage the display rail such that the first delivery-item transport equipment label is held against the front face by way of the tension applied to the display rail by the spring clips.

The method can further include permanently attaching the bracket to a metal surface of the delivery-item transport equipment, permanently attaching the first identifier to a first zone of the bracket, and permanently attaching the RFID chip to a second zone of the bracket. The first zone of the bracket has a first thickness and the second zone of the bracket has a second thickness. The second thickness is greater than the first thickness such that the RFID chip is separated from the metal surface by a greater distance than the first identifier.

The main body of the bracket can further include a front face and the method can further include permanently attaching the first identifier and the RFID chip to the front face of the main body.

The bracket can include a front face and an upper surface that intersects the front face at an angle of from 80° to 100°. The method can further include permanently attaching the first identifier to the upper surface and permanently attaching the second identifier to the upper surface.

A method for tracking and/or locating a delivery-item transport equipment is provided. According to the method, a bracket is permanently attached to a surface of the delivery-item transport equipment. A first identifier is permanently attached to a first zone of the bracket. A second identifier is permanently attached to a second zone of the bracket. A first delivery-item transport equipment label is temporarily attached to the bracket. The first delivery-item transport equipment label and at least one of the first identifier and the second identifier are scanned to associate the first delivery-item transport equipment label with at least the second identifier. At least the second identifier is scanned during or after movement of the delivery-item transport equipment to identify a first location of the delivery-item transport equipment and the first delivery-item transport equipment label.

In an implementation, temporarily attaching the first delivery-item transport equipment label to the bracket includes inserting the first delivery-item transport equipment label between a front face of a main body of the bracket and a display rail of the bracket and applying tension to the display rail using spring clips. The spring clips include spring clip mounting tabs that extend through slots in the main body. The spring clips physically contact and cooperatively engage the display rail such that the first delivery-item transport equipment label is held against the front face by way of the tension applied to the display rail by the spring clips.

In an implementation, the bracket can include a front face and an upper surface that intersects the front face at an angle of from 80° to 100°, and the method can further include permanently attaching the first identifier to the upper surface, permanently attaching the second identifier to the upper surface, and inserting the first delivery-item transport equipment label between the front face of the main body and a display rail of the bracket.

The method can further include identifying a first location of the delivery-item transport equipment and a first delivery item positioned on or within the delivery-item transport equipment based on the scanning of the second identifier during the use of the delivery-item transport equipment.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

For purposes of the present disclosure, unless otherwise specified, "delivery item" refers to one or more letters, packages, goods, freight, mail items, and/or other articles for transport between two or more locations, whether by or for public or private entities.

U.S. patent application Ser. No. 10/954,105, filed 30 Sep. 2004 and titled "Method and System for Tracking Assets in a Transportation Network", which is hereby incorporated herein by reference in its entirety, discloses a system for tracking assets through a transportation chain. The novel bracket described herein could, for example, be used in such a system.

As discussed above, a provider of transport or delivery services may collect real-time data related to in-transit tracking of delivery items (e.g. mail) by tracking containers, carts, and other assets used to transport the delivery items. An implementation of the present teachings includes a holder or bracket that can be attached to a service provider's assets. Use of the bracket improves and simplifies the secure positioning of temporary and permanent tracking devices, (such as labels, barcodes, and radio-frequency identification (RFID) devices), onto an asset such as any type of delivery-item transport equipment. Further, the bracket protects the tracking devices from damage and accidental removal from the delivery-item transport equipment, caused, for example, by physical contact with other equipment or personnel.

Figure 1:
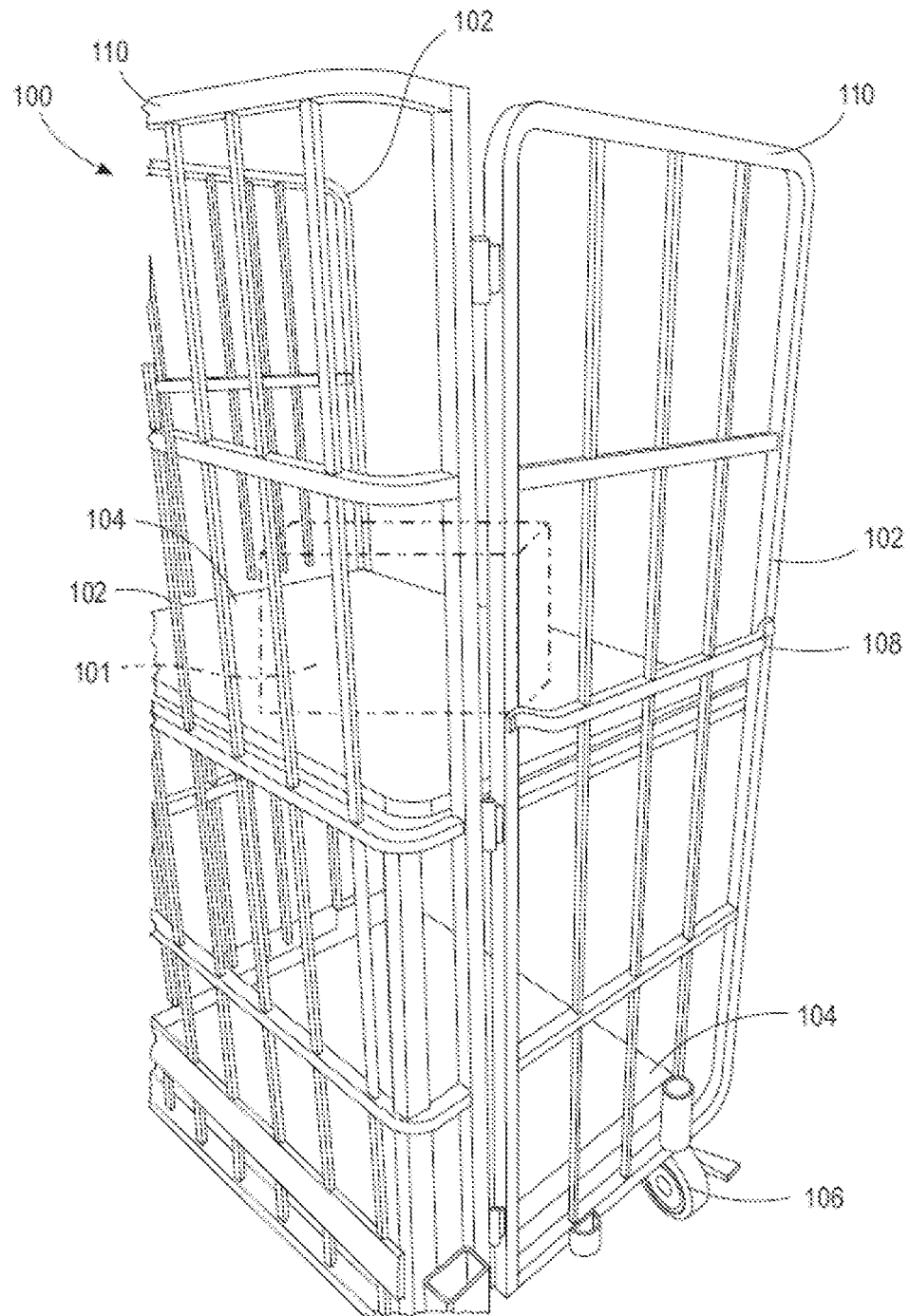
FIG. 1 is a perspective depiction of a delivery-item transport equipment in the form of a delivery-item transport cart in accordance with an example of an implementation of the present teachings.

FIG. 1 is a perspective depiction of an example of a transport cart 100 used to transport a delivery item(s) 101 placed thereon or therein. While FIG. 1 depicts one particular implementation, it will be appreciated that other types of delivery-item transport equipment having different designs are contemplated. In the example shown, the delivery-item transport cart 100 of FIG. 1 includes a plurality of walls 102, one or more shelves 104, and a plurality of rollers 106 to facilitate movement of the transport cart 100 across a floor or other surface. The transport cart 100 can further include one or more protruding bumpers or handles 108 and one or more rails 110 that, for example, define a perimeter of one of the walls 102.

Figure 2:
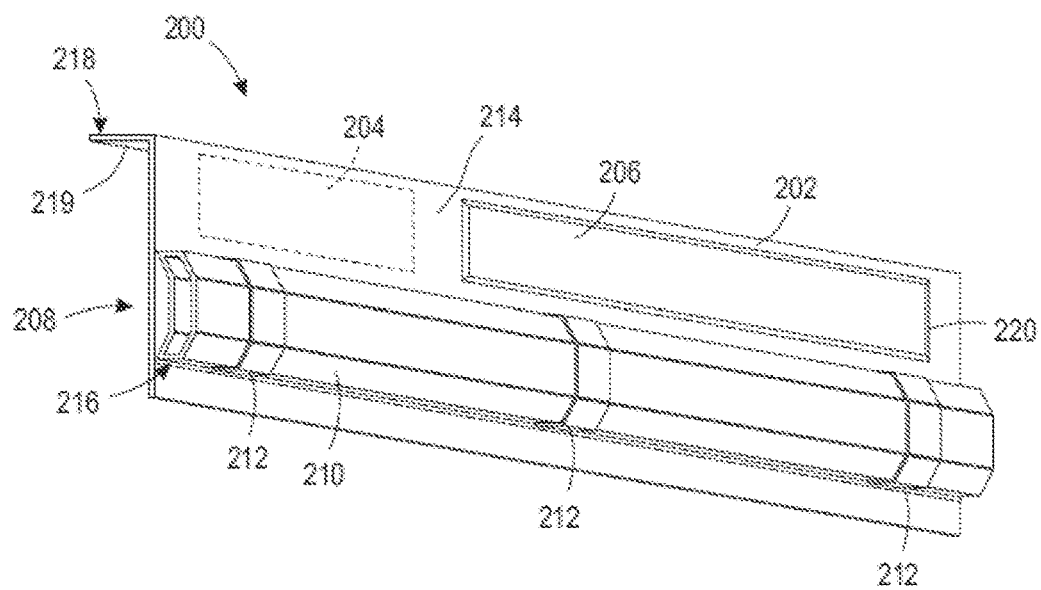
FIG. 2 is a perspective depiction of a delivery-item transport label bracket (e.g., "bracket") in accordance with an example of an implementation of the present teachings.
Figure 3:
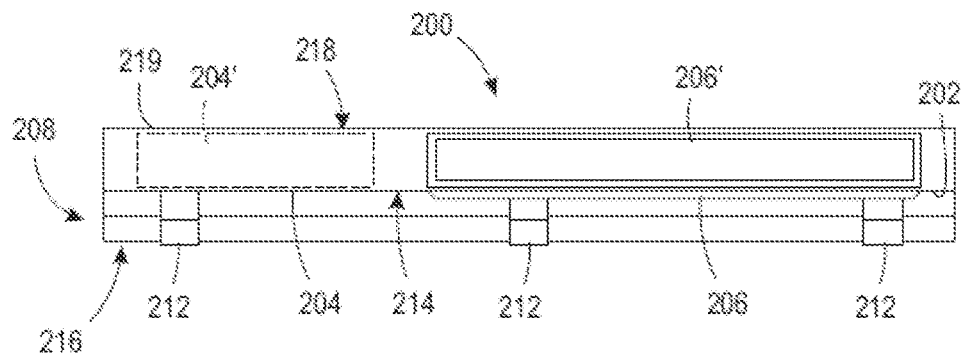
FIG. 3 is top view of the FIG. 2 bracket.
Figure 4:
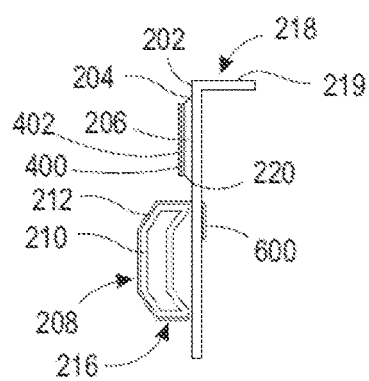
FIG. 4 is a side view of the FIG. 2 bracket.
Figure 5:
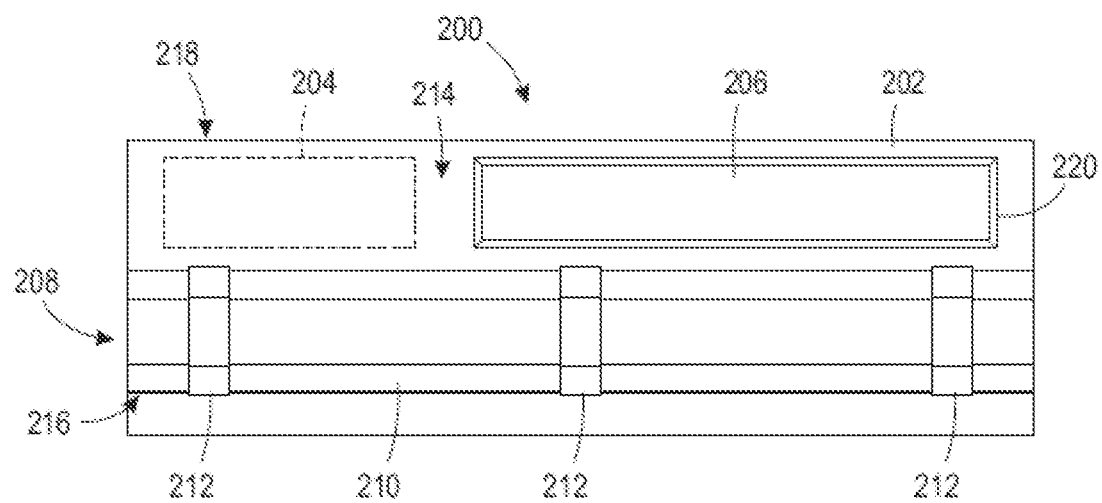
FIG. 5 is a front view of the FIG. 2 bracket.
Figure 6:
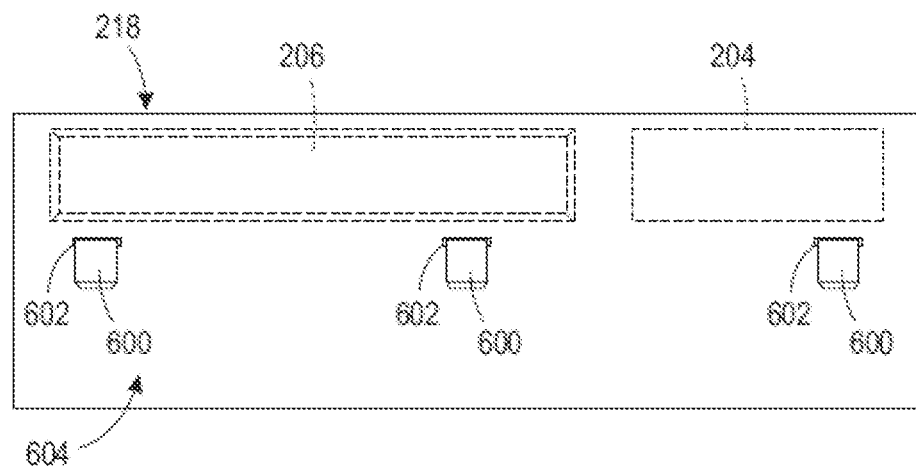
FIG. 6 is a rear view of the FIG. 2 bracket.

FIG. 2 is a perspective depiction, FIG. 3 is a top view, FIG. 4 is an end or side view, FIG. 5 is a front view, and FIG. 6 is a rear view of a transport equipment bracket (i.e., bracket) 200 according to an implementation of the present teachings. The bracket 200 can be permanently affixed to the transport cart 100 of FIG. 1 or to another type of delivery-item transport equipment or asset. In the example depicted, the bracket 200 can include a main body 202 manufactured, for example, from plastic, plexiglass, or another electrically insulative material. The main body 202 can include a first zone 204 and a second zone 206. In one implementation, the first zone 204 can be an area for mounting one or more permanent first identifier that uniquely identifies the transport cart 100; for example, a bar code printed onto a self-adhesive strip that is attached in the first zone 204. The first zone 204 is depicted in phantom as the first identifier can be placed at generally any location adjacent to the second zone 206. The second zone 206 can be an area for mounting one or more permanent second identifier that uniquely identifies the transport cart 100, for example a radio-frequency identification (RFID) tag or chip that is mounted in the second zone 206 using a pressure-sensitive adhesive or other means.

The bracket 200 further includes a placard mount 208 that can be configured to temporarily secure a placard such as a delivery-item transport equipment label, e.g., a mail transport equipment labeler (MTEL), to the bracket 200 and thus to the delivery-item transport cart 100. The placard mount 208 can include, for example, a display rail 210 and a plurality of spring clips 212. Each spring clip 212 can be secured to the main body 202 using a spring clip mounting tab 600 that extends through the main body 202 through a slot 602 defined by or in the main body 202, wherein each slot 602 of the plurality of slots 602 extends from a front face 214 to a back face 604 of the main body 202. The spring clips 212 physically contact and cooperatively engage the display rail 210 such that the display rail 210, (for example, at least a lower edge 216 of the display rail 210), is held under tension by the spring clips 212 against the front face 214 of the main body 202 to act as a clamp for a thin sheet of material (not shown in FIGS. 2-6; e.g., cardboard or the like), as described and shown below with respect to FIG. 7. During use, the lower edge 216 of the display rail 210 can be pivoted under tension approximately about the spring clip mounting tabs 600 (e.g., by a user pulling on the display rail 210 and/or pushing a sheet of material between the lower edge 216 and the front face 214). When pivoted, the display rail 210 moves away from the front face 214 and create a gap between the display rail 210 and the front face 214 of the main body 202 in which the sheet is clamped by the pressure of the spring clips 212.

It will be appreciated that one or both of the first zone 204 and the second zone 206 can be formed or situated at a different location on the bracket. For example, as depicted in the top view of FIG. 3, the first zone 204' and the second zone 206' can be positioned on an upper surface 218 of the bracket 200. In an implementation, during use, the front face 214 and the back face 604 can be vertically oriented, while the upper surface 218 can be horizontally oriented. In this implementation, the upper surface 218 can intersect the front face 214 at an angle of from about 80° to about 100°, for example about 90°, to facilitate scanning using, for example, human visual or automated techniques.

In an implementation, the main body 202 can include a face (for purposes of explanation, and without limiting, the front face 214 as depicted in FIG. 2, although the face can be the upper surface 218 or a different face) that has a raised platform 220 that extends away from the front face 214. The second zone 206 can be or include the raised platform 220. The raised platform 220 adds or increases a physical separation between the RFID chip from the delivery-item transport cart 100 which, if manufactured from metal, could cause or result in detrimental radio-frequency (RF) interference or performance reduction if the RFID chip is coupled directly to or within a few millimeters (e.g., within 5 mm) of the cart's metal surface. The exposed surface (generally 206) of the raised platform 220 can thus space the RFID chip positioned on the raised platform 220 from the delivery-item transport cart 100 by a distance of from about 5 mm to about 20 mm. A thickness of the bracket 200 through the second zone 206 can be greater than a thickness of the bracket 200 through the first zone 204.

Figure 7:
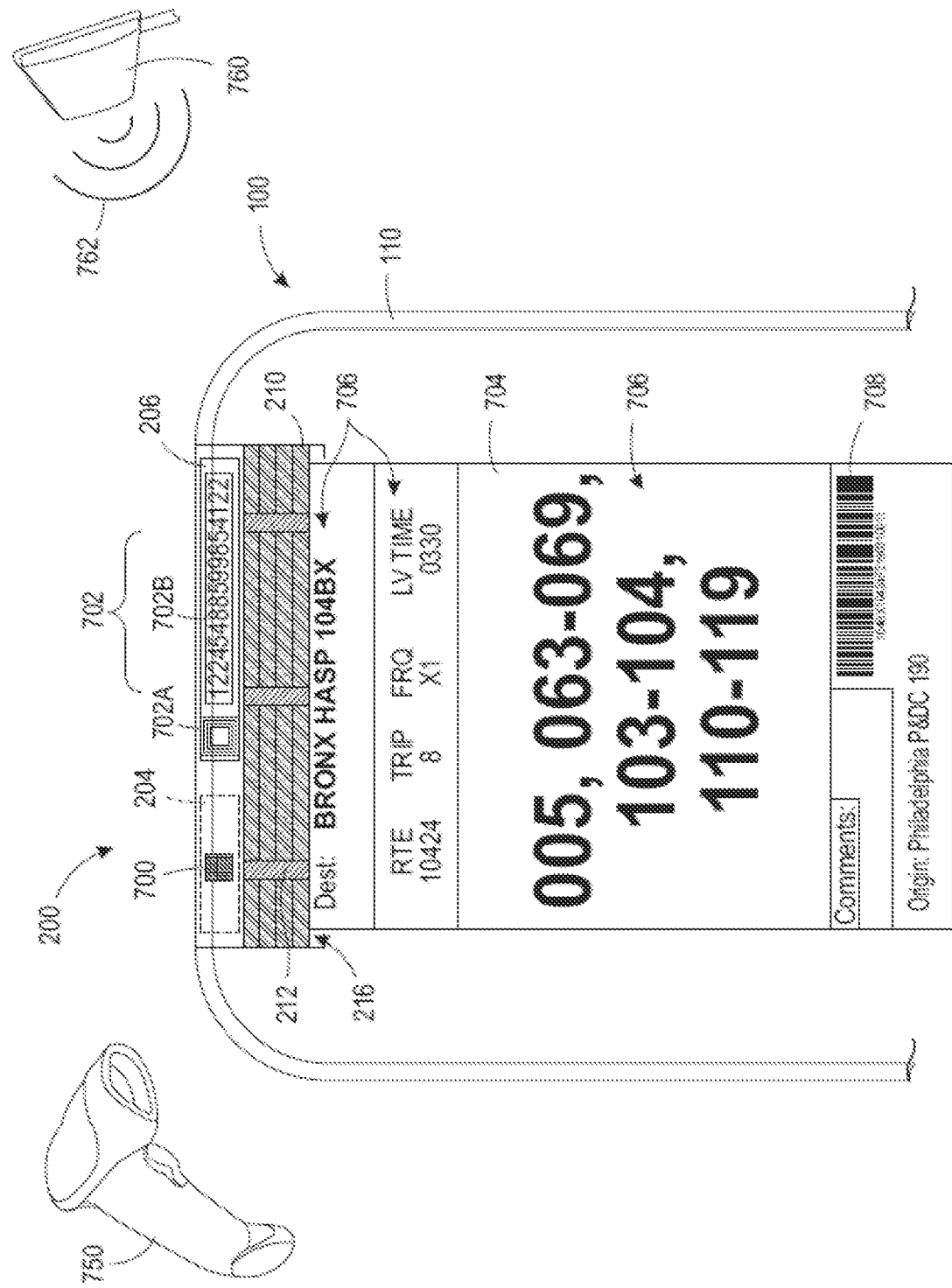
FIG. 7 is a front view of the bracket of FIG. 2 after attachment to a delivery-item transport cart 100 and after attaching identifiers to the bracket.

FIG. 7 is a front view of the FIG. 2 bracket 200 attached to the delivery-item transport cart 100. FIG. 2 depicts the bracket 200 after attachment of at least a first identifier 700 to the first zone 204 and at least a second identifier 702 to the second zone 206 of the bracket 200. In this implementation, the first identifier 700 can be or include a linear barcode or a two-dimensional (2D) barcode that can be scanned using an appropriate scanner or imager 750, or the first identifier 700 can be another type of identifier, such as another type of optical or printed identifier. The second identifier 702 can be or include an RFID chip 702A that can be read using an RFID interrogator 760 outputting and/or receiving radio waves 762. In this implementation, the second identifier 702 also includes a text, numeric, or alphanumeric code 702B, for example, a second identifier that can be visually identified and that is printed on a front surface of a carrier material having an adhesive backing. The first identifier 700 and the second identifier 702 are preferably permanently affixed to the bracket 200, using, for example, a pressure-sensitive adhesive 400 (FIG. 4). The pressure-sensitive adhesive 400 can be covered by a removable strip 402 prior to attaching the bracket 200 onto the delivery-item transport equipment, which is then removed to expose the adhesive 400. Similarly, the bracket 200 is preferably permanently affixed to the transport cart 100 (or other transport asset), using, for example, screws, nuts and bolts, rivets, welds, bent metal tabs, or the like. As used herein, the term "permanently attached" (and similar terms) means or includes attached in a manner that is not designed to be removed without using a tool such as a screwdriver, wrench, drill, pry bar, or the like.

FIG. 7 further depicts a third identifier 704 attached to the bracket 200 using the placard mount 208, which clamps the third identifier 704 to the bracket 200. In this implementation, the third identifier 704 is a placard, cardboard label, printed sheet, or the like (e.g., a delivery-item transport equipment label placard) that provides information 706 regarding the delivery items 101 (e.g., mail items) that are currently stored on or within the delivery-item transport cart 100, and can include a scannable code 708 that can be scanned using, for example, the barcode scanner 750, to identify, record, and/or report the third identifier 704. The third identifier 704 is temporarily attached to the bracket 200, and thus is temporarily attached to the transport cart 100, using the placard mount 208. In this implementation, an edge or end of the third identifier 704 can be inserted and positioned between the front face 214 of the bracket 200 and the lower edge 216 of the placard mount 208, and is secured or clamped in place by the tension applied to the display rail 210 by the spring clips 212.

Figure 8:
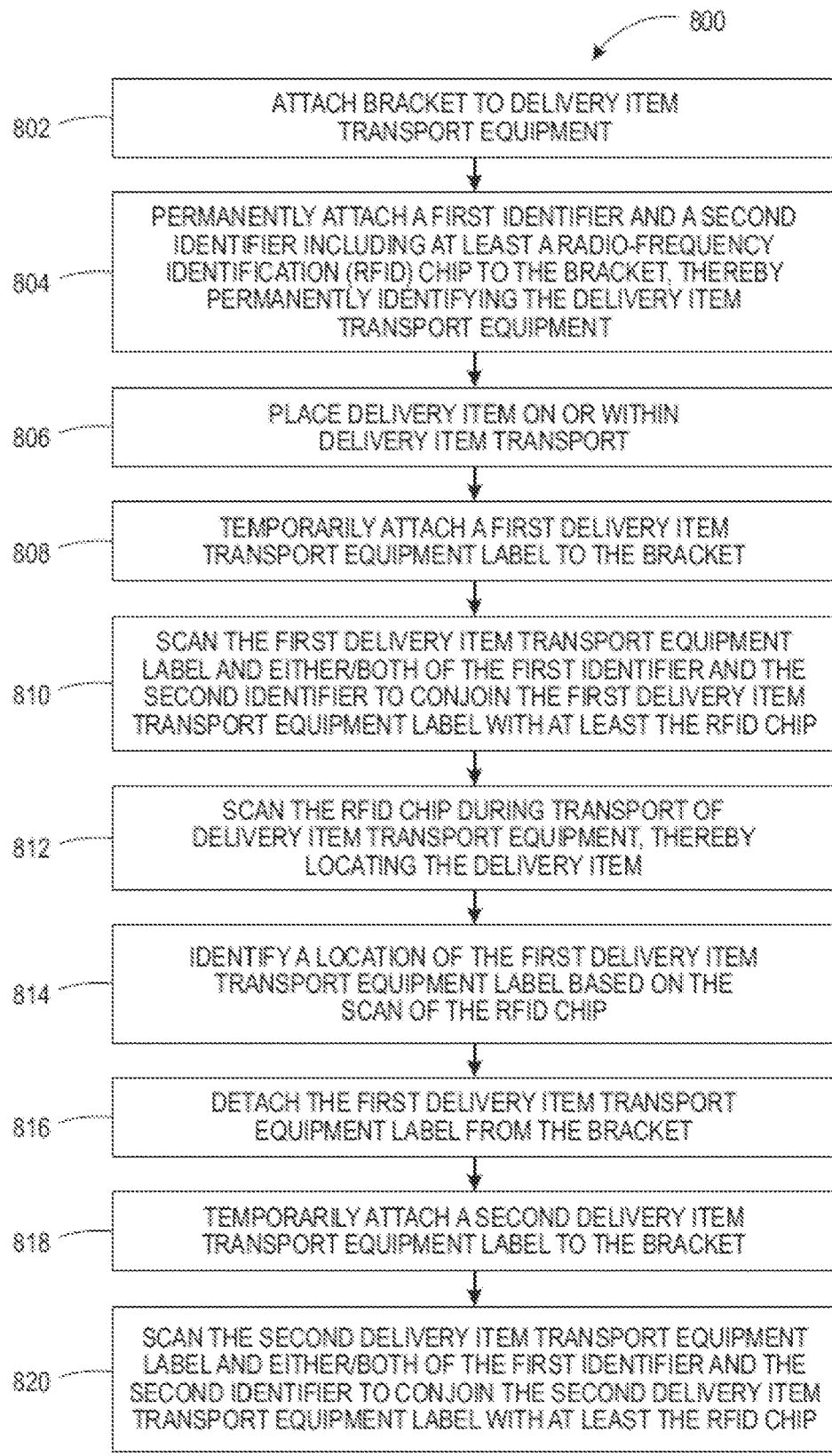
FIG. 8 is a flow chart of a method for tracking and/or locating delivery items according to an example of an implementation of the present teachings.

An example of a process or method 800 for tracking and/or locating delivery items is depicted in the flow chart of FIG. 8. The method 800 can proceed by operation or use of one or more of the structures depicted in the figures described above, and thus is described with reference to one or more of the previous figures; however, it will be appreciated that the method 800 is not limited to any particular structure or use unless expressly stated herein. It will be appreciated that while the method 800 is described as a series of acts or events, the present teachings are not limited by the ordering of such acts or events. Some acts can occur in different orders and/or concurrently with other acts or events apart from those described herein. Further, a method in accordance with the present teachings can include other acts or events that have not been depicted for simplicity, while other illustrated acts or events can be removed or modified.

The method 800 can begin by attaching a bracket 200 to a delivery-item transport equipment such as the delivery-item transport cart 100, as at 802. The bracket 200 can be attached, in a permanent manner, for example, to a rail 110 that, for example, defines a perimeter of one of the walls 102 of the transport cart 100. A first identifier 700 and a second identifier 702 including at least a RFID chip 702A can be attached to the bracket 200, for example, to the first zone 204 and the second zone 206 respectively. The operations 802 and 804 enable the bracket to permanently identify the delivery-item transport equipment 100. While the attachments of 802 and 804 are described as being permanent, it will be appreciated that instances where the identifiers 700, 702 and/or the bracket 200 can be replaced, for example, after damage of the bracket 200 or identifiers 700, 702, or before transfer of the delivery-item transport equipment to another entity. However, the bracket 200 and the identifiers 700, 702 attached thereto are preferably affixed to the delivery-item transport equipment for the life of the delivery-item transport equipment.

As at 806, one or more delivery item 101 can be placed on or within the delivery-item transport equipment and, at

808, a third identifier 704 (e.g., an initial or first delivery item or mail transport equipment label) can be temporarily attached to the bracket 200. The initial (i.e., first) delivery-item transport equipment label 704 and either or both of the first identifier 700 and the second identifier 702 can be scanned to conjoin or otherwise associate the initial delivery-item transport equipment label 704 with at least the RFID chip 702A, for example, as represented in the memory or storage of a computing system that locates or tracks delivery items. During use, transport, or movement of the delivery-item transport equipment, the RFID chip 702A can be scanned or read at known locations (e.g., by fixed RFID interrogators 760), thereby locating the delivery-item transport equipment, as at 812. Because the initial delivery-item transport equipment label 704 is associated or conjoined with at least the RFID chip 702A of the bracket 200, information from the scan of the RFID chip can be used to identify a location of the initial delivery-item transport equipment label 704 (i.e., the third identifier 704) as at 814. The association may be stored in a memory or a database of a computing system for tracking or locating delivery items.

Subsequently, the initial delivery-item transport equipment label 704 can be detached (e.g., unclamped) from the bracket 200 as at 816, and a second delivery-item transport equipment label can be attached to the bracket 200 via the placard mount 208, as at 818. This may be done, for example, because the contents of the transport cart 100 has changed. For instance, one or more delivery item(s) may be added to or removed from the transport cart 100 as part of the sorting and delivery process, and the second delivery-item transport equipment label 704 may represent the current inventory or contents of the transport cart 100 after items are added or removed.

The second delivery-item transport equipment label can be analogous (e.g., similar form factor and/or identifying information) to the initial delivery-item transport equipment label 704, or different. Next, as at 820, the second delivery-item transport equipment label and either/both of the first identifier 700 and the second identifier 702 can be scanned to associate or otherwise conjoin the second delivery-item transport equipment label (e.g., the current third identifier 704) with at least the RFID chip 702A. The process 800 can then loop and repeat as needed, for example, loop back to operation 812, using the second delivery-item transport equipment label with the first identifier 700 and the second identifier 702.

It will be appreciated that a processing system for performing the method 800 described with reference to FIG. 8 using the structures described with reference to FIGS. 1-7, and variations thereof encompassed by the claims herein, can be designed by one of ordinary skill in the art from this disclosure.

It will be appreciated that the bracket 200 as described herein can be used to track assets other than a delivery item, for example, the transport cart 100 or other transport equipment or asset to which the bracket 200 is attached. Transport equipment is a long term investment requiring maintenance and replacement. Because the bracket 200 and its associated identifiers are linked with the specific asset, maintenance records, time in service, usage data, etc., can be kept for the asset so that maintenance and/or replacement of the asset can be performed at desired intervals.

The description thus far has focused primarily on benefits to mail and shipment transportation networks, where reusable assets (e.g., a shipping container that functions as a transport cart 100) are commonly used for transportation to and from distribution centers. Additionally, other industries that rely on resupply from a distribution center (e.g., grocery stores, retail stores, and other retailers or resellers) may benefit through the use of an implementation of the bracket 200 by tracking shipment status and asset utilization. For instance, a specific grocery store may have a defined list of items in short supply and request a resupply of those items from a distribution center. The specific items being shipped to the grocery store from the distribution center can be listed on a packing sheet (i.e., a third identifier 704) and temporarily secured or affixed to the placard mount 208 of the bracket 200, where the bracket 200 is permanently secured or affixed to the shipping container 100. The first identifier 700 and the second identifier 702 on the bracket 200 can then be used to track the items being shipped from the distribution center to the grocery store. After offloading the items being shipped, the location of the empty asset (e.g., the shipping container 100) can be tracked using the first identifier 700 and/or the second identifier 702 until it is returned to the distribution center, thereby providing improved and more detailed tracking and management of assets. Using the bracket 200 in this implementation thus provides similar or identical functionality as it does for the implementation in mail and package transportation networks. Similar benefits may be realized by other retail stores such as drug stores and auto part stores, as well as wholesale suppliers and part manufacturers shipping to final assembly locations, and/or tracking assets back to the distribution center or to another destination.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for tracking and/or locating a delivery item, comprising:
    temporarily attaching a first delivery-item transport equipment label to a bracket, wherein the bracket comprises a main body with a first identifier permanently attached to the bracket and a second identifier comprising a radio-frequency identification (RFID) chip permanently attached to the bracket;
    scanning the first delivery-item transport equipment label and at least one of the first identifier and the second identifier to associate the first delivery-item transport equipment label with at least the RFID chip;
    scanning the RFID chip during use of a delivery-item transport equipment to which the bracket is attached; and
    identifying a location of the first delivery-item transport equipment label based on the scanning of the RFID chip.

2. The method of claim 1, further comprising:
    permanently attaching the first identifier to a first zone of the bracket; and
    permanently attaching the RFID chip to a second zone of the bracket.

3. The method of claim 2, wherein:
    the first zone of the bracket has a first thickness;
    the second zone of the bracket has a second thickness; and
    the second thickness is greater than the first thickness.

4. The method of claim 3, wherein the second zone has a thickness of from 5 millimeters (mm) to 20 mm.

5. The method of claim 1, wherein the temporarily attaching of the first delivery-item transport equipment label to the bracket comprises:
    inserting the first delivery-item transport equipment label between a front face of the main body and a display rail of the bracket; and
    applying a tension to the display rail using a plurality of spring clips, the plurality of spring clips comprising a plurality of spring clip mounting tabs extending through a plurality of slots in the main body, and the plurality of spring clips physically contacting and cooperatively engaging the display rail such that the first delivery-item transport equipment label is held against the front face by way of the tension applied to the display rail by the plurality of spring clips.

6. The method of claim 1, further comprising:
    permanently attaching the bracket to a metal surface of the delivery-item transport equipment;
    permanently attaching the first identifier to a first zone of the bracket; and
    permanently attaching the RFID chip to a second zone of the bracket, wherein:
    the first zone of the bracket has a first thickness;
    the second zone of the bracket has a second thickness; and
    the second thickness is greater than the first thickness such that the RFID chip is separated from the metal surface by a greater distance than the first identifier.

7. The method of claim 6, further comprising permanently attaching the first identifier to the first zone of the bracket using a pressure-sensitive adhesive.

8. The method of claim 1, wherein the main body of the bracket comprises a front face and the method further comprises:
    permanently attaching the first identifier to the front face of the main body; and
    permanently attaching the RFID chip to the front face of the main body.

9. The method of claim 1, wherein the bracket comprises a front face and an upper surface that intersects the front face at an angle of from 80° to 100°, and the method further comprises:
    permanently attaching the first identifier to the upper surface; and
    permanently attaching the second identifier to the upper surface.

10. The method of claim 1, wherein the scanning the RFID chip during use of the delivery-item transport equipment further comprises scanning the RFID chip using a fixed RFID interrogator during transport or movement of the delivery-item transport equipment, thereby locating a delivery item positioned on or within the delivery-item transport equipment.

11. The method of claim 1, further comprising:
    identifying a first location of the delivery-item transport equipment and a first delivery item positioned on or within the delivery-item transport equipment based on the scanning of the RFID chip during the use of the delivery-item transport equipment.

12. A method for tracking and/or locating a delivery-item transport equipment, comprising:
    permanently attaching a bracket to a surface of the delivery-item transport equipment;
    permanently attaching a first identifier to a first zone of the bracket;

permanently attaching a second identifier to a second zone of the bracket;

temporarily attaching a first delivery-item transport equipment label to the bracket;

scanning the first delivery-item transport equipment label and at least one of the first identifier and the second identifier to associate the first delivery-item transport equipment label with at least the second identifier; and scanning at least the second identifier during or after movement of the delivery-item transport equipment to identify a first location of the delivery-item transport equipment and the first delivery-item transport equipment label.

13. The method of claim 12, wherein permanently attaching the second identifier to the second zone of the bracket comprises permanently attaching a radio-frequency identification (RFID) chip to the second zone of the bracket.

14. The method of claim 13, wherein the second zone has a thickness of from 5 millimeters (mm) to 20 mm.

15. The method of claim 12, wherein temporarily attaching the first delivery-item transport equipment label to the bracket comprises:

inserting the first delivery-item transport equipment label between a front face of a main body of the bracket and a display rail of the bracket; and applying a tension to the display rail using a plurality of spring clips, the plurality of spring clips comprising a plurality of spring clip mounting tabs extending through a plurality of slots in the main body, and the plurality of spring clips physically contacting and cooperatively engaging the display rail such that the first delivery-item transport equipment label is held against the front face by way of the tension applied to the display rail by the plurality of spring clips.

16. The method of claim 12, wherein:

the permanently attaching the bracket to a surface of the delivery-item transport equipment comprises permanently attaching the bracket to a metal surface of the delivery-item transport equipment, the second identifier is a radio-frequency identification (RFID) chip, the first zone of the bracket has a first thickness, the second zone of the bracket has a second thickness, and the second thickness is greater than the first thickness such that the RFID chip is separated from the metal surface by a greater distance than the first identifier.

17. The method of claim 16, wherein the permanently attaching a first identifier to a first zone of the bracket comprises permanently attaching the first identifier to the first zone of the bracket using a pressure-sensitive adhesive.

18. The method of claim 12, further comprising:

permanently attaching the first identifier to a front face of a main body of the bracket;

permanently attaching the second identifier to the front face of the main body of the bracket; and inserting the first delivery-item transport equipment label between the front face of the main body and a display rail of the bracket.

19. The method of claim 12, wherein the bracket comprises a front face and an upper surface that intersects the front face at an angle of from 80° to 100°, and the method further comprises:

permanently attaching the first identifier to the upper surface;

permanently attaching the second identifier to the upper surface; and inserting the first delivery-item transport equipment label between the front face of the main body and a display rail of the bracket.

20. The method of claim 12, further comprising:

identifying a first location of the delivery-item transport equipment and a first delivery item positioned on or within the delivery-item transport equipment based on the scanning of the second identifier during the use of the delivery-item transport equipment.

* * * * *